United States Patent Office 3,288,635
Patented Nov. 29, 1966

3,288,635
COATING PROCESS
William Green and Harry Hyman Topper, Manchester, England, assignors to Imperial Chemical Industries Limited, London, England, a corporation of Great Britain
No Drawing. Filed Jan. 9, 1963, Ser. No. 250,239
Claims priority, application Great Britain, Jan. 15, 1962, 1,357/62
13 Claims. (Cl. 117—128.4)

This invention relates to a coating process for metal and more particularly to a coating process for metal springs or complete spring assemblies.

According to the present invention we provide a process for coating metal springs which comprises treatment with a solution of a silicone-modified alkyd coating composition in a chlorinated hydrocarbon solvent, substantial removal of the solvent and curing of the residual film of coating composition during heat treatment of the springs.

The term "springs" is used here in the sense of including not only individual springs but also complete spring assemblies, for example the spring frames for mattresses, seats, upholstery, and the like.

The preferred chlorinated hydrocarbon solvent for use in our process is trichloroethylene, though others (for example perchloroethylene) may be used if desired.

Spring wire is commonly lightly oiled, for example as a result of light lubrication in the spring-forming operation, and it is an advantage of the present process that such a wire may be coated directly without any special pre-treatment such as degreasing or phosphating. However, where the metal wire has become wet or rusty or is heavily contaminated with dirt or heavy grease it is usually necessary that it should be cleaned before treatment by our process.

To obtain good adhesion between a conventional coating composition and the metal surface it is essential that the metal surface should be free from grease. In the present invention it is an advantage that the chlorinated hydrocarbon solvent acts both as a degreasing agent and as a solvent for the coating composition. During the coating operation any contamination of the wire is dissolved in the chlorinated hydrocarbon solution of the coating composition and then partly redeposited in the film of coating composition when the solvent is removed. Provided that the total contamination does not exceed 5% of the total weight of the final coating composition, the dried film is not adversely affected but in practice it is unlikely that contamination will exceed 2% of the final coating composition.

The silicone-modified alkyd coating composition used in this invention provides excellent corrosion resistance, and it is a particular advantage of this invention that the curing of the coating composition takes place during the normal heat tempering treatment given to the spring metal. The silicone employed is, in particular, a polydimethylsiloxane and preferably has a viscosity of approximately 100 centistokes at 25° C., but it is especially preferred that the viscosity should not be higher than this value.

The alkyd employed may be chosen from a wide range of compositions which are soluble in the chlorinated hydrocarbon solvent, for example in trichloroethylene, and may be derived from the conventional polyfunctional components, for example phthalic acid, maleic acid, isophthalic acid, glycerol, and other polycarboxylic acids, polyhydric alcohols and modifiers. Especially suitable alkyds are those derived from a drying oil, and particularly from dehydrated castor oil, and include for example castor oil drying alkyds of short-medium oil length, and medium-long modified alkyds modified with drying oils especially those oils of the castor oil type. The selected alkyd is dissolved in the chlorinated hydrocarbon solvent to give a solution of appropriate solids content, conveniently between 5% and 40% by weight, but it is preferred that the solids content lies between the limits 10% and 20% by weight. The silicone may be incorporated into the chlorinated hydrocarbon solvent solution of the alkyd, in an amount such that the solution contains between 0.2% and 0.4% of silicone by weight.

We have found that the colour of these coating compositions changes with the stoving conditions and therefore the final colour of the coating may be taken as a guide to the heat treatment which the spring metal has received.

In a typical embodiment of the process of the present invention the suitably suspended metal springs or complete assemblies are passed through a dip tank containing the solution of the coating composition in the chlorinated hydrocarbon solvent, then through a solvent extraction system such that there is no significant amount of residual solvent present in the film of the coating composition, and finally the springs or complete assemblies are subjected to the heat treatment normally applied, for example in the tempering of spring wire.

We have found it advantageous that the articles to be coated should be immersed in the solution of the coating composition. If the coating composition is at the normal ambient temperatures encountered in the workshop it is advantageous to have an immersion time of at least 15 seconds in order that the degreasing of the metal may take place, but where the coating composition is heated the immersion time may be significantly reduced. The coating composition may be heated to temperatures up to the boiling point of the solvent if required (e.g. 87° C. when the solvent is trichloroethylene), and the use of such warm or hot solutions assists the degreasing part of the process and results in an improved appearance with freedom from run marks, fat edges and blobs. The concentration of the coating composition in the dip bath should be adjusted in relation to the speed of withdrawal so that a film of the desired thickness and properties may be obtained.

The heat treatment given to the springs may vary widely, depending on the properties desired for the final springs. Such treatment for spring wire, for example, normally ranges from 15 minutes at 270° C. to 60 minutes at 200° C., where these times are at the maximum temperature reached. When a normal heat treatment has been applied, the coating is generally a deep golden brown shade. The coating is generally almost colourless when no heat treatment or insufficient heat treatment has been given, but almost black after an excessive heat treatment.

The springs or complete assemblies coated according to the process of the present invention have a high resistance to both indoor and outdoor corrosion and in particular provide ample protection for springs in the period between their manufacture and actual use. The coating shows good resistance to salt and sea spray, weak acids and organic solvents.

The coating adheres firmly to the spring metal and is not removed, for example by repeated flexing or by a finger nail scratch. It shows good resistance to impact, heat and abrasion and the springs are free from squeak, even when allowed to rub against each other.

The invention is illustrated but not limited by the following example in which the percentages are by weight:

*Example*

A wire spring unit was passed through a dip tank containing a coating composition which comprised a 20% solution of a dehydrated castor oil/glycerol phthalate alkyd in trichloroethylene and contained 0.3% of a polydimethylsiloxane having a viscosity of 100 centistokes at 25° C. The spring unit was immersed in the coating composition for approximately 20 seconds at a temperature of 20° C., and the solvent was then substantially removed in a suitable extraction system. The spring unit was then stoved for 15 minutes at 270° C.

After repeating flexing of the spring unit 5,000 times, the coating still adhered firmly to the spring wire. There were no signs of corrosion after four weeks of outdoor and 12 months of indoor exposure.

When a mild steel panel was coated in a manner similar to that for the spring unit and with a coating of the same composition, the coating had excellent resistance to high humidity, salt and sea spray, weak acids, organic solvents, abrasion, impact and heat, and was free from squeak.

What we claim is:

1. Process for the coating of metal springs which comprises treatment with a solution of a silicone-modified alkyd resin coating composition in a chlorinated hydrocarbon solvent, substantial removal of the solvent, and curing of the residual film of coating composition during heat treatment of the spring.

2. Process as claimed in claim 1 wherein the chlorinated hydrocarbon solvent is trichloroethylene.

3. Process as claimed in claim 1 wherein the alkyd is derived from a drying oil.

4. Process as claimed in claim 1 wherein the alkyd is derived from dehydrated castor oil.

5. Process as claimed in claim 1 wherein the silicone is a polydimethylsiloxane.

6. Process as claimed in claim 5 wherein the silicone has a viscosity not higher than 100 centistokes at 25° C.

7. Process as claimed in claim 1 wherein the proportion of silicone is such that the solution contains between 0.2% and 0.4% by weight of the silicone.

8. Process as claimed in claim 1 wherein the solids content of the solution of coating composition is between 5% and 40% by weight.

9. Process as claimed in claim 8 wherein the solids content of the solution of coating composition is between 10% and 20% by weight.

10. Process as claimed in claim 1 wherein the treatment of the springs is by immersion.

11. Process as claimed in claim 10 wherein the treatment is for at least 15 seconds at ambient temperature.

12. Process as claimed in claim 1 wherein the heat treatment is for a period from 15 to 60 minutes at a temperature in the range 200° C. to 270° C.

13. A metal spring having thereon a cured film of a silicone-modified alkyd resin.

References Cited by the Examiner

UNITED STATES PATENTS

| | | | |
|---|---|---|---|
| 2,584,340 | 2/1952 | Goodwin et al. | 260—824 X |
| 2,584,351 | 2/1952 | Hunter et al. | 260—824 X |
| 2,587,295 | 2/1952 | Doyle et al. | 260—824 X |
| 2,607,755 | 8/1952 | Brunnell | 260—824 |
| 2,861,897 | 11/1958 | Hendrixson | 117—49 X |
| 2,932,503 | 4/1960 | Le Van | 117—132 |
| 2,979,417 | 4/1961 | Kruger | 117—132 |
| 3,015,576 | 1/1962 | Hendrixson et al. | 117—49 |

OTHER REFERENCES

McGregor: Silicones and Their Uses, 1954, McGraw-Hill Book Co., pp. 113–115.

ALFRED L. LEAVITT, *Primary Examiner.*

R. S. KENDALL, *Assistant Examiner.*